United States Patent [19]

Ueda et al.

[11] Patent Number: 5,048,940
[45] Date of Patent: Sep. 17, 1991

[54] PROJECTION LENS FOR PROJECTOR

[75] Inventors: Kiichirou Ueda; Akira Ishisaka, both of Hachioji, Japan

[73] Assignee: Konica Corporation, Tokyo, Japan

[21] Appl. No.: 470,365

[22] Filed: Jan. 25, 1990

[30] Foreign Application Priority Data

Jan. 26, 1989 [JP] Japan ............................ 1-150167
Oct. 4, 1989 [JP] Japan ............................ 1-257885
Oct. 24, 1989 [JP] Japan ............................ 1-274989

[51] Int. Cl.$^5$ ............................................. B29D 11/00
[52] U.S. Cl. ............................... 359/708; 359/649
[58] Field of Search ............. 350/412, 432, 463, 469, 350/471

[56] References Cited

U.S. PATENT DOCUMENTS

4,770,513 9/1988 Fujie et al. ..................... 350/412
4,900,139 2/1990 Kreitzer ......................... 350/412
4,924,244 5/1990 Kataoka et al. ................ 350/412
4,963,007 10/1990 Moskovich ..................... 350/432

Primary Examiner—Paul M. Dzierzynski
Attorney, Agent, or Firm—Finnegan, Henderson, Farabow, Garrett, and Dunner

[57] ABSTRACT

A lens for a highly precise and fine projector that may response to a television of high quality must have a large aperture ratio and a wide field angle, and chromatic aberrations should be well corrected. A projector lens according to the present invention comprises, from a screen side, a first lens group including at least one positive single lens and negative single lens, a second lens group having a strong refracting power including one positive lens and negative lens, a third positive lens group having a relatively weak refracting power, and a fourth lens group having a negative lens with a concave surface having a strong curvature directed toward the screen, characterized in that the third lens group has at least one aspherical surface.

6 Claims, 7 Drawing Sheets

SPHERICAL
ABERRATION

ASTIGMATISM

DISTORTION

PROJECTION LENS FOR PROJECTOR

BACKGROUND OF THE INVENTION

1. Field of the Invention

The present invention relates to a projection lens, and more particularly to a projection lens which is bright and has a high resolution suitable for a projection lens of a high definition television.

2. Description of the Prior Art

As is known, a television projector is to project an display plane of a cathode-ray tube or a liquid crystal display plane on a screen in an enlarged scale by a projection lens. The television projector now has a demand not only for business but also for home. On the other hand, a so-called high definition television having a resolution about twice of a conventional television has a sign for a practical use mainly for business use and is expected to spread for home use. Under these situations, a television projector also has a higher demand for its high image quality. A television projector which can maintain a highly precise and fine image quality as seen in a high definition television has been required.

For realizing the aforementioned desire, an attempt has been made not only to improve a lens itself but curve an display plane of a cathode-ray tube and an display plane of a liquid crystal so as to obtain a high performance. These examples are disclosed in Japanese Patent Application Laid-Open Publication Nos. 181009/1983, 200215/1985, 145517/1986, 264716/1988, etc. In these publications, monochromatic aberrations are corrected but chromatic aberrations are not sufficiently corrected, being difficult to obtain a highly precise and fine image.

On the other hand, as examples of lenses which enable correction of chromatic aberrations, lenses as described in Japanese Patent Application Laid-Open Publication Publication Nos. 241717/1986, 85515/1988 and the like are known. However, these lenses have not been sufficiently fulfilled with the desire for obtaining a further highly precise and fine image.

Examples of a projector lens intended to obtain a highly precise and fine image quality are seen in Japanese Patent Application Laid-Open Publication Nos. 106427/1987, 85212/1987 and the like. In these lenses, as will be apparent from examples thereof, an aspherical lens is used as a first lens to correct the spherical aberration, the comatic aberration, etc. caused by an aperture.

However, actually, the technique for preparation of an aspherical lens is not-yet completed, and at present the preparation thereof is extremely difficult. In case of an aspherical lens formed of plastics. which is relatively simple in processing, this lens is inferior to a glass lens in environmental characteristics such as heat resistance, humidity resistance and the like. Particularly, in case where an aspherical lens is used in a portion very sensitive to the error of the aberration caused by an aperture as in the first lens, the spherical aberration is much affected, and higher order flare occurs to lower the contrast and deteriorate the image quality, thus making it difficult to realize a highly precise and fine projector.

In order to solve this problem, it is contemplated to use a spherical lens as a first lens. However, it has been heretofore essential to use an aspherical surface for the first lens group in order to realize a highly precise and fine image quality in design. Therefore, it has been contemplated to be difficult to realize it using the spherical lens for the first lens.

However, there is a high desire to the realization of a projection lens for a projector which can well correct various aberrations and can obtain a highly precise image quality as in a high definition television with less components while using a spherical lens as a first lens. The present invention is to provide a projection lens which can satisfy such desires.

SUMMARY OF THE INVENTION

It is an object of the present invention to provide a projection lens for a projector with relatively less number of lenses which can well correct various aberrations while using a spherical lens as a first lens, which is easily manufactured, which is of a small size and which has a high image quality.

A projection lens for a projector according to the present invention comprises, from a screen side, a first lens group including at least one positive single lens and negative single lens, a second lens group having a strong refracting power including a positive lens and a negative lens, a third positive lens group having a relatively weak refracting power, and a fourth lens group having a negative lens with a concave surface having a strong curvature directed toward the screen, characterized in that said third lens group has at least one aspherical surface.

It is further desired that the projector lens according to the present invention is, in addition to the abovedescribed fundamental structure, fulfilled with the following conditions:

$$-0.06 < f\left(\frac{1}{f_{2+} \cdot \nu_{2+}} + \frac{1}{f_{2-} \cdot \nu_{2-}}\right) < 0.09 \quad (I)$$

where
- f: Equivalent focal length of the entire system
- $f_{2+}$: Focal length of a positive lens in a second lens group
- $f_{2+}$: length of a negative lens in a second lens group
- $\gamma_{2+}$: Abbe's number of a positive lens in a second lens group
- $\gamma_{2+}$: Abbe's number of a negative lens in a second lens group In the projection lens for a projector according to the present invention, the first lens group having at least one positive lens and negative lens from the screen side well corrects the aberrations caused by an aperture. Especially the said negative lens well corrects the aberrations caused by an aperture, comatic aberration and both on-axis (longitudinal) and magnification (lateral) chromatic aberrations occurring in the first lens group including at least one positive lens. The second lens group having a converging effect comprises one positive lens and one negative lens to bear a considerable portion of the refracting power of the entire system, and the negative lens is possible to well correct longitudinal and lateral chromatic aberrations resulting from the positive lens having a strong refracting power.

The third lens group comprises a positive lens group having a relatively weak refracting power, which is used to well correct the comatic aberration in the marginal portion of an image plane.

The fourth lens group has a negative lens with a concave surface having a strong curvature directed toward the screen, which is used to obtain a good image surface.

At least one or more aspherical surfaces are disposed in the third lens group whereby the comatic aberration of the marginal portion of the image plane can be well corrected to obtain a precise and fine image quality.

It becomes possible to well correct the longitudinal chromatic aberration by fulfilling the conditions formuler (I) relating to the focal length of the positive lens in the second lens group, the Abbe's number of the positive lens, the focal length of the negative lens, the Abbe's number of the negative lens and the equivalent focal length of the entire system, as the conditions for enhancing the practical performance, in addition to the aforementioned fundamental structure. If the value exceeds the upper limit of the present condition, a short of correction occurs, and if exceeding the lower limit thereof, a surplus of correction occurs, which bring a deterioration of image quality due to the lowering of contrast.

DETAILED DESCRIPTION OF THE PREFERRED EMBODIMENTS

Figure 1:
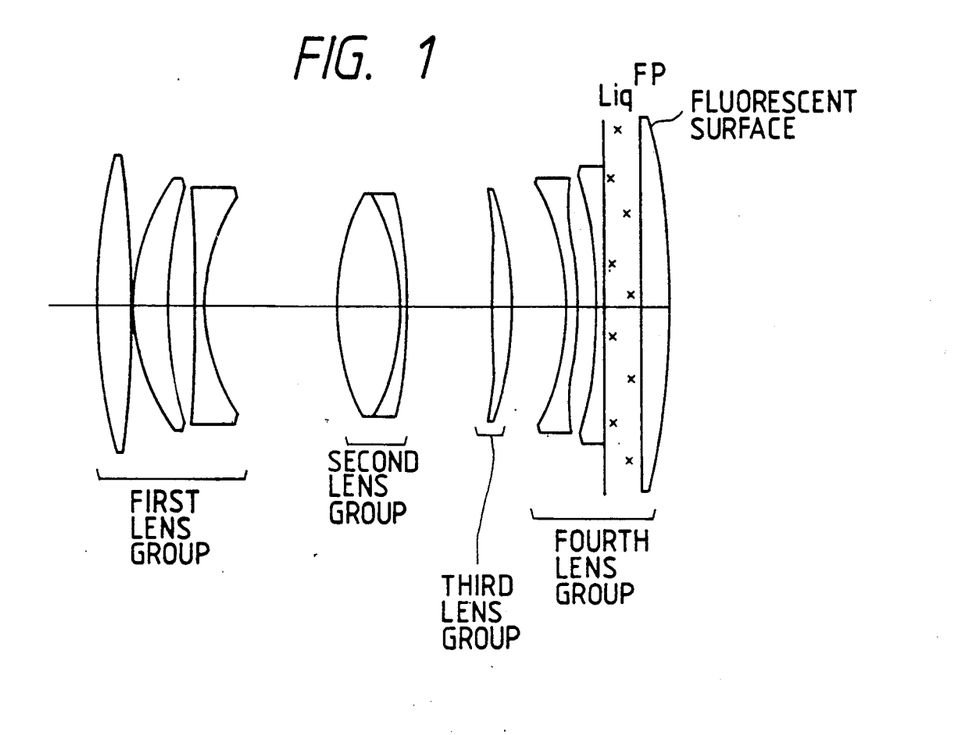
FIGS. 1 to 3 are sectional views of Examples 1 to 3, respectively, of a projection lens according to the present invention.
Figure 2:
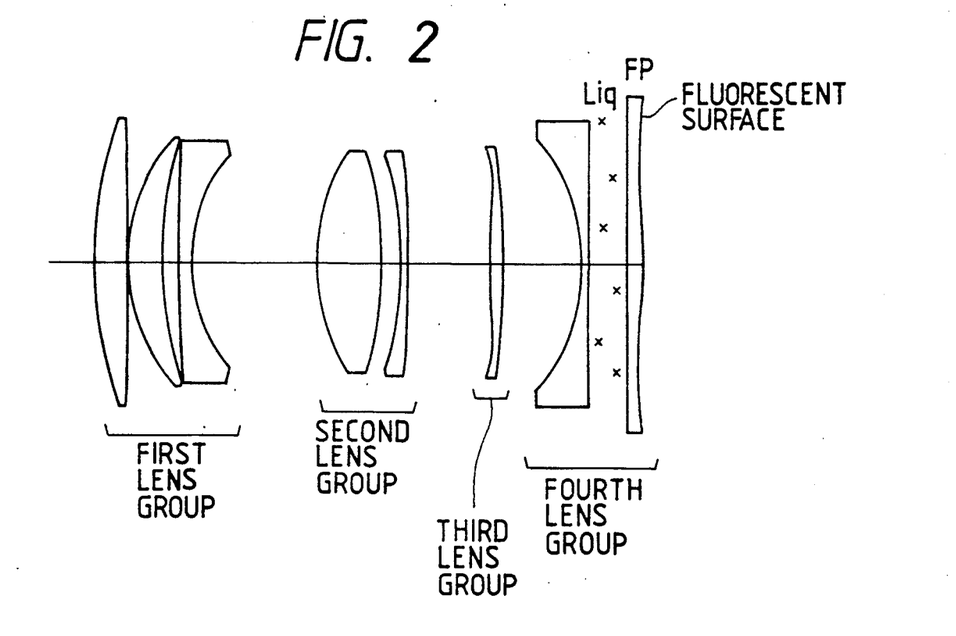
Figure 3:
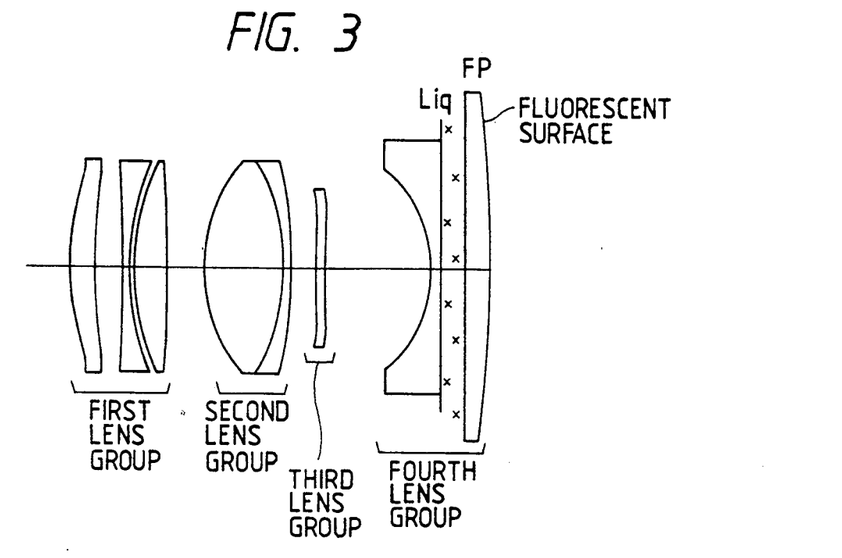
Figure 4:
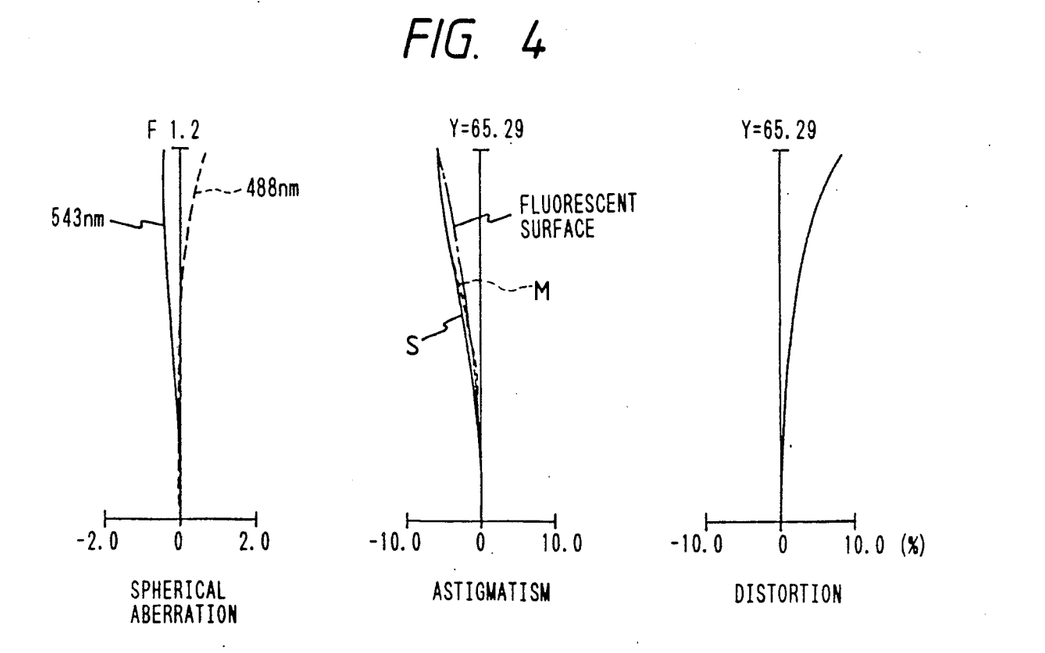
FIGS. 4 to 6 show aberrations of Examples 1 to 3, respectively.
Figure 5:
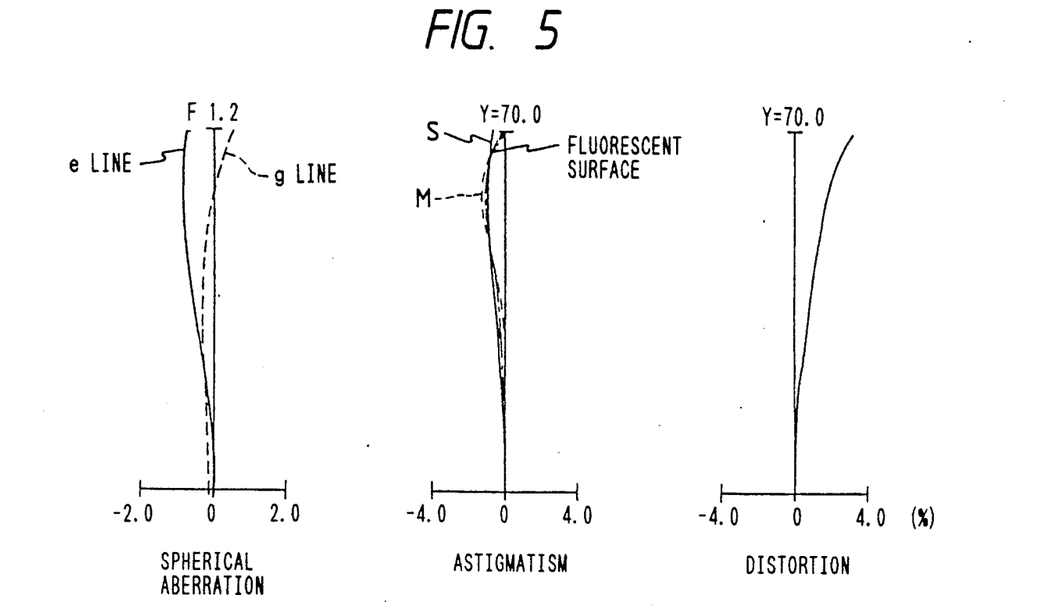
Figure 6:
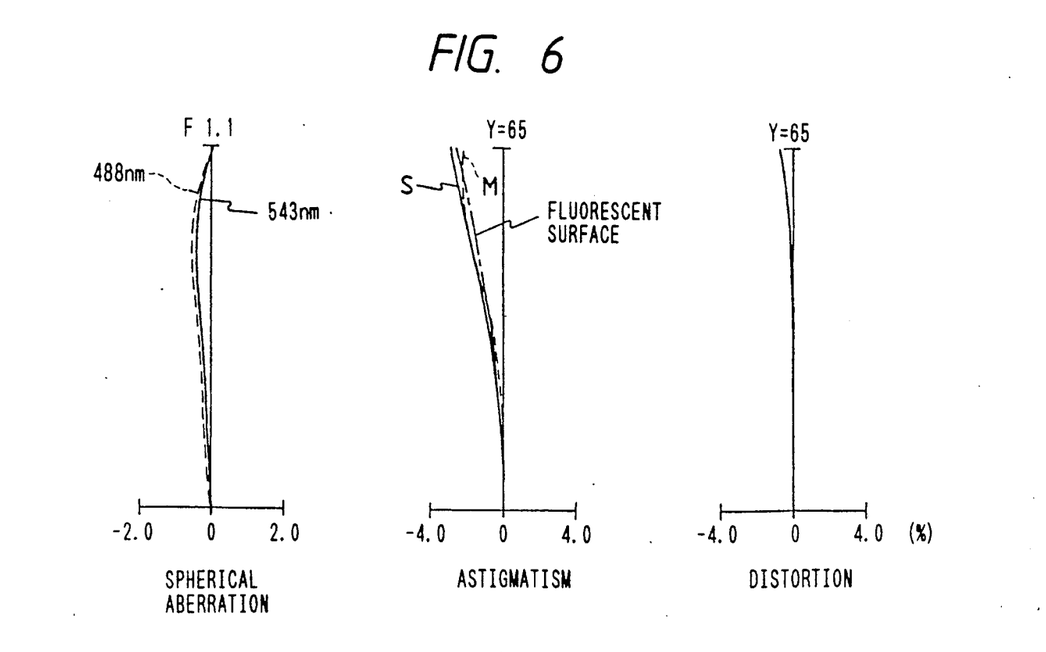

As shown in FIGS. 1 to 3, a projection lens for a projector according to the present invention shown as first to third examples comprises, from a screen side, a first lens group having at least one positive single lens and negative single lens, a second lens group having a strong refracting power having one positive lens and negative lens, a third positive lens group having a relatively weak refracting power, and a fourth lens group having a negative lens with a concave surface having a strong curvature directed toward the screen, characterized in that said third lens group and said fourth lens group have at least one or more aspherical surfaces, and an object surface in a magnifying system is curved.

Since the object surface in the magnifying system is curved into a spherical surface or an aspherical surface, a CRT or a liquid crystal image plane is formed into a curved surface adjusted to the curve thereof whereby the correction of image surface can be particularly well conducted to improve an image quality of the entire image plane.

The projector lens in these examples is auxiliarily fulfilled with the following conditions in addition to the above-described fundamental structure.

(1) In the conditions of Formula (I), it is desired to be within the range of $$-0.01 < f\left(\frac{1}{f_{2+} \cdot \nu_{2+}} + \frac{1}{f_{2-} \cdot \nu_{2-}}\right) < 0.03$$

(2)

$$-0.95 < f/R < -0.01$$

where
f: Equivalent focal length of the entire system
R: Radius of curvature on the optical axis of an object surface in a magnifying system (3)

$$0.05 < f/f_3 < 0.55$$

where
f: Equivalent focal length of the entire system
$f_3$: Focal length of the third lens group (4)

$$0.70 < f/f_2 < 1.30$$

where
f: Equivalent focal length of the entire system
$f_2$: Focal length of the second lens group As the condition for enhancing the practical performance of the projector lens, the condition (2) relates to the radius of curvature on the optical axis of the object surface (that is, the fluorescent surface of CRT) in the magnifying system and the Equivalent focal length of the entire system. The present condition is fulfilled whereby correction of the curvature of field becomes easy, and particularly a good image quality can be obtained in the marginal portion of the image surface. If the value exceeds the upper limit of this condition, it is necessary to obtain a flat image surface only by the lens system, making it difficult to correct the curvature of field and particularly making it difficult to obtain a high image quality in the marginal portion of an image surface. On the other hand, if the value exceeds the lower limit, the curvature of field must be put to an extreme short of correction in the lens system, making it difficult to correct, which is unfavorable.

For further improving the performance, the object surface in the magnifying system may be formed into an aspherical surface.

The condition (3) relates to the equivalent focal length of the entire system and the focal length of the third lens group. The present condition is fulfilled whereby correction of meridional comatic aberration from the intermediate portion to the marginal portion of the image plane becomes easy and an improvement of image quality may be expected. If the value exceeds the upper limit of the present condition, an under flare of a meridional coma is increased in the marginal portion of the image plane to lower contrast whereas if the value exceeds the lower limit of the condition, the lowering of contrast caused by an over flare of a meridional coma results. In the present invention, an aspherical surface is used for the third lens group whereby a further improvement of image quality may be expected.

The condition (4) relates to the equivalent focal length of the entire system and the focal length of the second lens group. The present condition is fulfilled to thereby provide a sufficient converging effect without being accompanied by the deterioration of image quality. If the value exceeds the upper limit of the present condition, a sagital flare increases to lower contrast, whereas if the value exceeds the lower limit, a refracting power of the third lens group increases to deteriorate an image quality at the marginal portion of the image plane.

In the example, there comprises, from a screen side, a first lens group having three independent elements including two positive single lenses and a negative single lens with a concave surface having a strong curvature directed toward the side opposite to the screen, a second lens group comprising two lenses including a positive lens and a negative lens, a third lens group comprising a positive single lens having a weaker refracting power than that of said second lens group, and a fourth lens group having a negative lens with a concave surface having a strong curvature directed toward the screen, an object surface in an magnifying system being curved. In the present invention, the curve of the object surface is realized by providing the curvature on the surface opposite to the screen (fluorescent surface) of a face plate. An aspherical surface having an inflection point is provided in the third lens group or the fourth lens group to suppress an occurrence of a sagital coma flare in the marginal portion of the image plane.

In Tables, reference character $r_i$ represents the radius of curvature of apex of the ith lens surface from the screen side; $d_i$ the axial distance of the ith lens surface from the screen side; $n_i$ the refractive index for wavelength of 543 nm or e-line (546.07 nm) of the ith lens material from the screen side; and $\gamma_d$ the Abbe's number. An aspherical surface is defined by $$X = \frac{C\phi^2}{1 + \sqrt{1 - (1 + K)C^2\phi^2}} + \Sigma Ai\phi^{pi}$$

$$\phi = \sqrt{y^2 + z^2}$$

where C represents the curvature at the vertex; K the conic constant; $A_i$ 1 *the coefficient of aspherical surface; and power number,* $P_i(P_i>2.0)$, in the rectangular coordinate with the vertex of surface as an original point and an optical-axis as an X-axis.

In Tables, a liquid layer Liq and a shape of the surface opposite to the screen (fluorescent surface) of a face plate FP are also shown.

Figure 7:
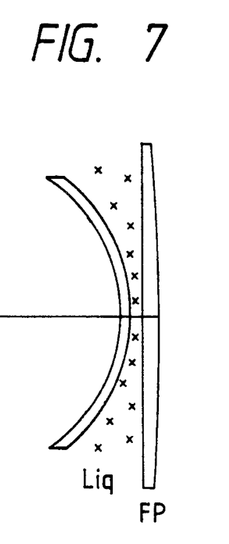
FIG. 7 is a sectional view of a lens in contact with a liquid layer in case where said lens is a meniscus lens.

A lens in contact with the screen side of a liquid layer can be a meniscus shape as shown in FIG. 7 by a little modification, which is effective to reduce cost.

EXAMPLE 1 f = 136.04   F No. = 1.2
Magnification: 6.9 ×   Image height: 65.29
Half-field angle: 20° 20′

|   |     | r         | d     | n543    | $\nu_d$ |
|---|-----|-----------|-------|---------|---------|
| 1 |     | 247.948   | 14.50 | 1.71641 | 53.8    |
| 2 |     | −546.392  | 1.00  |         |         |
| 3 |     | 89.614    | 15.00 | 1.69686 | 53.2    |
| 4 |     | 208.355   | 10.50 |         |         |
| 5 |     | −1240.869 | 4.00  | 1.70490 | 30.1    |
| 6 |     | 80.252    | 56.00 |         |         |
| 7 |     | 106.064   | 26.00 | 1.59161 | 61.2    |
| 8 |     | −106.005  | 3.50  | 1.62443 | 36.3    |
| 9 |     | −227.343  | 36.50 |         |         |
| *10 |   | 570.401   | 7.50  | 1.49425 | 55      |
| *11 |   | −234.462  | 23.73 |         |         |
| *12 |   | −107.275  | 5.00  | 1.49425 | 55      |
| *13 |   | −171.011  | 7.84  |         |         |
| 14  |   | −218.627  | 3.20  | 1.62443 | 36.3    |
| 15  | Liq | ∞       | 15.80 | 1.41000 |         |
| 16  | FP  | ∞       | 12.47 | 1.54230 |         |
| 17  |   | 350.0     |       |         |         |

| Aspherical coefficient | Power number |
|---|---|
| Tenth surface | |
| K = 0.0 | |
| A1 = −7.35810 × $10^{-7}$ | P1 = 4.0000 |
| A2 = −3.66500 × $10^{-11}$ | P2 = 6.0000 |
| A3 = 0.84940 × $10^{-15}$ | P3 = 8.0000 |
| A4 = −1.61460 × $10^{-18}$ | P4 = 10.0000 |
| Eleventh surface | |
| K = 0.0 | |
| A1 = −6.23466 × $10^{-7}$ | P1 = 4.0000 |
| A2 = 2.01301 × $10^{-11}$ | P2 = 6.0000 |
| A3 = 6.30160 × $10^{-14}$ | P3 = 8.0000 |
| A4 = −1.17301 × $10^{-17}$ | P4 = 10.0000 |
| Twelfth surface | |
| K = 5.93475 × $10^{-1}$ | |
| A1 = −7.10720 × $10^{-7}$ | P1 = 4.0000 |
| A2 = 2.96041 × $10^{-10}$ | P2 = 6.0000 |
| A3 = 1.39995 × $10^{-13}$ | P3 = 8.0000 |
| A4 = −4.62997 × $10^{-17}$ | P4 = 10.0000 |
| Thirteenth surface | |
| K = 4.82430 | |
| A1 = 2.59960 × $10^{-7}$ | P1 = 4.0000 |
| A2 = 5.74650 × $10^{-11}$ | P2 = 6.0000 |
| A3 = 1.06246 × $10^{-13}$ | P3 = 8.0000 |
| A4 = −1.60195 × $10^{-17}$ | P4 = 10.0000 |

(*Aspheridal surface)

EXAMPLE 2 f = 136.05   F No. = 1.2
Magnification: 7.98 ×   Image height: 70
Half-field angle: 21° 55′

|    |     | r         | d     | $n_e$   | $\nu_d$ |
|----|-----|-----------|-------|---------|---------|
| 1  |     | 193.583   | 13.00 | 1.72391 | 43.7    |
| 2  |     | 10295.77  | 1.00  |         |         |
| 3  |     | 82.482    | 15.30 | 1.69661 | 53.2    |
| 4  |     | 196.607   | 7.00  |         |         |
| 5  |     | 1438.919  | 4.40  | 1.73429 | 28.5    |
| 6  |     | 74.611    | 53.00 |         |         |
| 7  |     | 96.269    | 27.00 | 1.60549 | 60.7    |
| 8  |     | −178.347  | 8.30  |         |         |
| 9  |     | −161.709  | 3.50  | 1.58975 | 30      |
| 10 |     | −424.825  | 34.95 |         |         |
| *11 |    | 421.195   | 5.00  | 1.49410 | 55      |
| *12 |    | −342.616  | 33.12 |         |         |
| *13 |    | −74.799   | 3.50  | 1.58975 | 30      |
| 14 | Liq | ∞       | 16.00 | 1.41000 |         |
| 15 | FP  | ∞       | 7.00  | 1.54212 |         |
| *16 |    | −4118.753 |       |         |         |

| Aspherical coefficient | Power number |
|---|---|
| Eleventh surface | |
| K = 0.0 | |
| A1 = −4.16705 × $10^{-7}$ | P1 = 4.0000 |
| A2 = −7.36454 × $10^{-11}$ | P2 = 6.0000 |
| A3 = −1.21618 × $10^{-14}$ | P3 = 8.0000 |
| A4 = −9.43824 × $10^{-18}$ | P4 = 10.0000 |
| Twelfth surface | |
| K = 0.0 | |
| As = 3.70354 × $10^{-9}$ | P1 = 4.0000 |
| A2 = 1.22335 × $10^{-11}$ | P2 = 6.0000 |
| A3 = 1.46884 × $10^{-15}$ | P3 = 8.0000 |
| A4 = 2.34270 × $10^{-18}$ | P4 = 10.0000 |
| Thirteenth surface | |
| K = −5.42527 × $10^{-1}$ | |
| A1 = 5.33484 × $10^{-9}$ | P1 = 4.0000 |
| A2 = 1.11594 × $10^{-11}$ | P2 = 6.0000 |
| A3 = 6.57146 × $10^{-14}$ | P3 = 8.0000 |
| A4 = −1.46494 × $10^{-17}$ | P4 = 10.0000 |
| Sixteenth surface | |
| K = 0.0 | |
| A1 = −1.01227 × $10^{-7}$ | P1 = 4.0000 |

5,048,940

-continued

| | | | |
|---|---|---|---|
| A2 = | $-3.22772 \times 10^{-11}$ | P2 = | 6.0000 |
| A3 = | $1.24553 \times 10^{-14}$ | P3 = | 8.0000 |

EXAMPLE 3 f = 102.70  F No. = 1.1
Magnification: 7.45 ×   Image height: 65
Half-field angle of view: 26°42'

| | | r | d | n543 | $\nu_d$ |
|---|---|---|---|---|---|
| * | 1 | 115.179 | 12.00 | 1.49425 | 55 |
| * | 2 | 392.374 | 12.90 | | |
| * | 3 | $-8506.997$ | 3.50 | 1.59061 | 30 |
| * | 4 | 90.346 | 1.50 | | |
| | 5 | 115.583 | 15.00 | 1.51841 | 64.1 |
| | 6 | $-1418.180$ | 18.01 | | |
| | 7 | 80.961 | 37.00 | 1.59162 | 61.2 |
| | 8 | $-94.837$ | 3.00 | 1.62444 | 36.3 |
| | 9 | $-245.336$ | 11.18 | | |
| * | 10 | 259.737 | 5.00 | 1.49425 | 55 |
| * | 11 | 812.426 | 48.87 | | |
| | 12 | $-57.855$ | 4.00 | 1.62444 | 36.3 |
| | 13 | Liq $\infty$ | 10.99 | 1.41000 | |
| | 15 | FP $\infty$ | 12.34 | 1.54230 | |
| | 16 | $-907.0$ | | | |

| | Aspherical coefficient | Power number |
|---|---|---|
| First surface | | |
| K = | $1.59500 \times 10^{-1}$ | |
| A1 = | $-3.50080 \times 10^{-7}$ | P1 = 4.0000 |
| A2 = | $9.52302 \times 10^{-12}$ | P2 = 6.0000 |
| A3 = | $-3.82344 \times 10^{-14}$ | P3 = 8.0000 |
| A4 = | $-3.43237 \times 10^{-19}$ | P4 = 10.0000 |
| Second surface | | |
| K = | $4.28870 \times 10$ | |
| A1 = | $2.29946 \times 10^{-7}$ | P1 = 4.0000 |
| A2 = | $-2.12840 \times 10^{-11}$ | P2 = 6.0000 |
| A3 = | $-1.39960 \times 10^{-14}$ | P3 = 8.0000 |
| A4 = | $-1.45713 \times 10^{-17}$ | P4 = 10.0000 |
| Third surface | | |
| K = | $1.00000 \times 10^2$ | |
| A1 = | $-1.02834 \times 10^{-7}$ | P1 = 4.0000 |
| A2 = | $-1.92001 \times 10^{-11}$ | P2 = 6.0000 |
| A3 = | $-4.82562 \times 10^{-15}$ | P3 = 8.0000 |
| A4 = | $-1.02498 \times 10^{-17}$ | P4 = 10.0000 |
| Fourth surface | | |
| K = | $-4.49960$ | |
| A1 = | $5.38314 \times 10^{-8}$ | P1 = 4.0000 |
| A2 = | $-6.59256 \times 10^{-11}$ | P2 = 6.0000 |
| A3 = | $-2.59921 \times 10^{-14}$ | P3 = 8.0000 |
| A4 = | $6.09286 \times 10^{-18}$ | P4 = 10.0000 |
| Tenth surface | | |
| K = | $7.94400 \times 10^{-1}$ | |
| A1 = | $-4.74015 \times 10^{-7}$ | P1 = 4.0000 |
| A2 = | $-1.11628 \times 10^{-9}$ | P2 = 6.0000 |
| A3 = | $-1.88371 \times 10^{-14}$ | P3 = 8.0000 |
| A4 = | $1.28497 \times 10^{-16}$ | P4 = 10.0000 |
| Eleventh surface | | |
| K = | $2.20860$ | |
| A1 = | $2.19364 \times 10^{-7}$ | P1 = 4.0000 |
| A2 = | $-1.21134 \times 10^{-9}$ | P2 = 6.0000 |
| A3 = | $1.67684 \times 10^{-13}$ | P3 = 8.0000 |
| A4 = | $7.76820 \times 10^{-17}$ | P4 = 10.0000 |

| | f/R | $f\left(\dfrac{1}{f_{2+} \cdot \nu_{2+}} + \dfrac{1}{f_{2-} \cdot \nu_{2-}}\right)$ | $f/f_2$ | $f/f_4$ |
|---|---|---|---|---|
| Example 1 | $-0.39$ | 0.012 | 1.06 | 0.40 |
| Example 2 | $-0.03$ | 0.011 | 1.02 | 0.36 |
| Example 3 | $-0.11$ | 0.004 | 0.93 | 0.13 |

Figure 8:
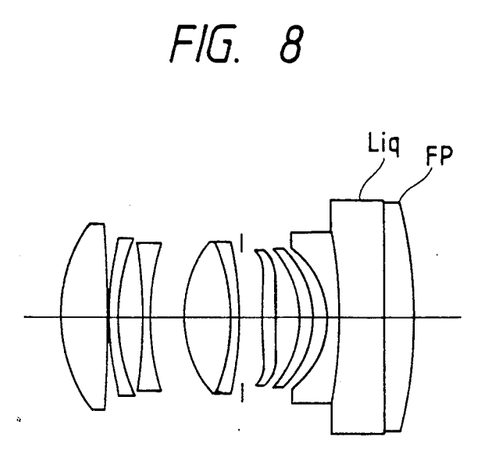
FIG. 8 is a sectional view of a fourth example.
Figure 9:
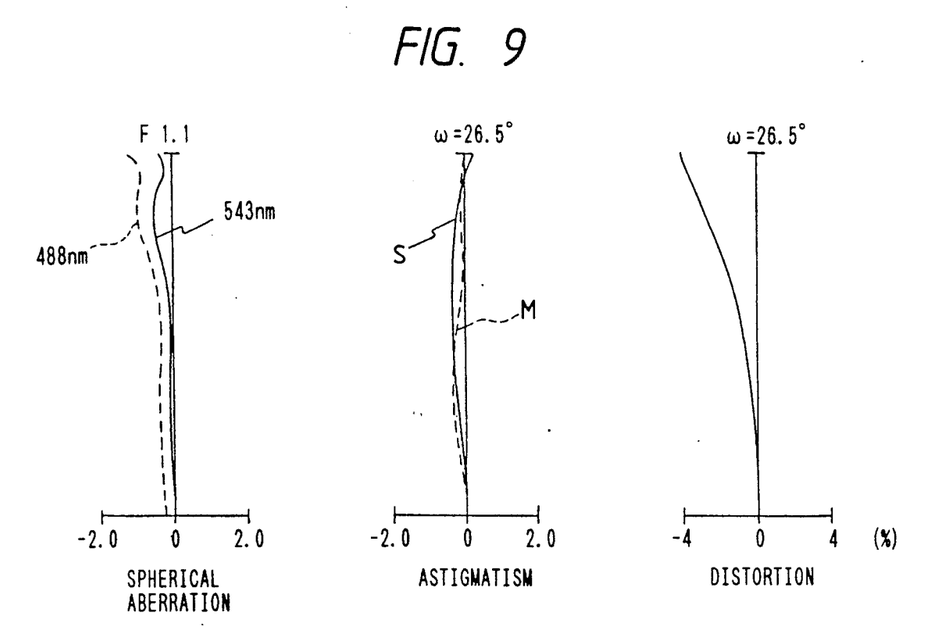
FIG. 9 shows aberrations thereof.
Figure 10:
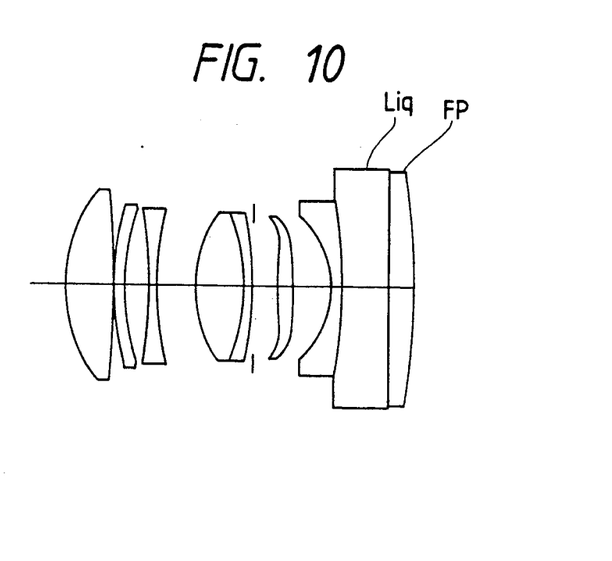
FIG. 10 is a sectional view of a fifth example.
Figure 11:
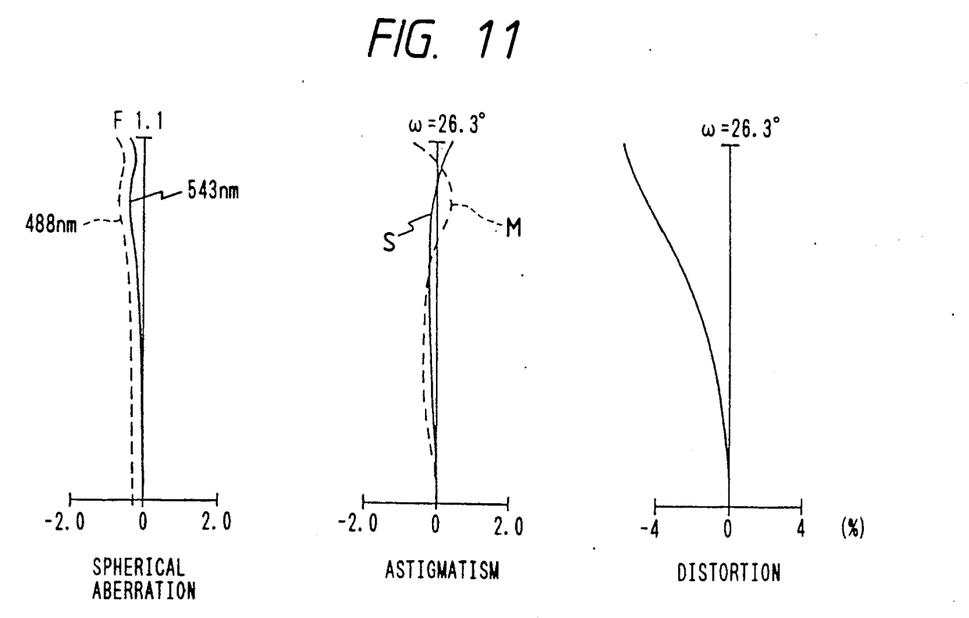
FIG. 11 shows aberrations thereof.

A projection lens for a projector according to the present invention in a fourth and a fifth examples comprises, in order from a screen side, a first lens group comprising a first lens unit including a positive lens, a second lens unit including a lens having an aspherical surface and having a weak refracting power and a third lens unit including a biconcave negative lens, and a second lens group including a biconvex positive lens and negative lens.

The projector lens according to the present invention is fulfilled with the following conditions as the auxiliary conditions.

The condition shown in Formula (I) is desired to be within the range of $$-0.06 < f\left(\frac{1}{f_{2+} \cdot \nu_{2+}} + \frac{1}{f_{2-} \cdot \nu_{2-}}\right) < 0.09 \quad (5)$$

$\nu_1 > 45$, $\nu_3 < 40$
$0.9 < |f_1/f_3| < 1.1$ where
  $\gamma_1$: Abbe's number of a positive lens in a first lens unit
  $\gamma_3$: Abbe's number of a negative lens in a third lens unit
  $f_1$: Focal length of a first lens unit
  $f_3$: Focal length of a third lens unit $$D/F < 0.1 \quad (6)$$

D: On-the axis air space between a first lens unit and a second lens unit.

In these examples, despite the fact that a glass spherical lens is used as a first lens, an aspherical lens having a weak refracting power is arranged directly thereafter whereby correction of spherical aberration, comatic aberration or the like caused by an aperture can be made. Two positive and negative lenses are used in the second group whereby chromatic aberrations are well corrected. These lenses may be cemented. An aspherical surface is used in the third group lens to correct an astigmatism.

The condition (5) is concerned with the Abbe's number of the first lens unit and the third lens unit and the focal length. The condition of the Abbe's number is fulfilled whereby chromatic aberrations produced in the first lens unit and the third lens unit are well corrected.

The lower limit of $|f_1/f_3|$ is set in consideration of chromatic aberrations, and the upper limit is determined so as not to increase the diameter of the second group.

The condition (6) is concerned with the on-the-axis air space of the first lens unit and the second lens unit and the focal length of the entire system. If this condition is so deviated that D increases, the effect of the aspherical surface in the second lens unit with respect to the correction of aberration decreases.

EXAMPLE 4

Focal length f: 110.52
Half-field angle $\omega = 26.5°$
Aperture ratio 1:1.1   Magnification factor 8.44
$|f_1/f_3| = 0.98$ $$f\left(\frac{1}{f_{4a} \cdot \nu_{4a}} + \frac{1}{f_{4b} \cdot \nu_{4b}}\right) = -0.0466$$

$D/f = 9.05 \times 10^{-3}$

| Surface No. | r | d | n | $\nu_d$ |
|---|---|---|---|---|
| 1 | 90.775 | 25.000 | 1.59162 | 61.2 |
| 2 | $-1064.7$ | 1.000 | | |

-continued

| | | | | |
|---|---|---|---|---|
| * 3 | | 123.11 | 5.000 | 1.49425 | 57.0 |
| * 4 | | 98.091 | 13.000 | | |
| 5 | | −304.14 | 5.000 | 1.70490 | 30.1 |
| 6 | | 156.10 | 18.020 | | |
| 7 | | 69.091 | 26.000 | 1.59162 | 61.2 |
| 8 | | −108.76 | 5.000 | 1.62444 | 36.3 |
| 9 | | −185.36 | 1.000 | | |
| 10 | | stop | 11.036 | | |
| * 11 | | 162.12 | 8.800 | 1.49425 | 57.0 |
| * 12 | | −863.74 | 11.425 | | |
| * 13 | | −67.517 | 8.000 | 1.49425 | 57.0 |
| 14 | | −54.659 | 8.000 | | |
| 15 | | −48.276 | 5.500 | 1.62444 | 36.3 |
| 16 | Liq | −334.62 | 26.000 | 1.41651 | |
| 17 | FP | ∞ | 14.150 | 1.53980 | |
| 18 | Fluo-rescent surface | −350.00 | | | |

| | Aspherical coefficient | Power number |
|---|---|---|
| Third surface | $K = 0.0$ | |
| | $A_1 = -1.4064 \times 10^{-6}$ | $P_1 = 4.0$ |
| | $A_2 = 8.4568 \times 10^{-10}$ | $P_2 = 6.0$ |
| | $A_3 = -4.3914 \times 10^{-13}$ | $P_3 = 8.0$ |
| | $A_4 = 8.2383 \times 10^{-17}$ | $P_4 = 10.0$ |
| Fourth surface | $K = 0.0$ | |
| | $A_1 = -1.3621 \times 10^{-6}$ | $P_1 = 4.0$ |
| | $A_2 = 1.2674 \times 10^{-9}$ | $P_2 = 6.0$ |
| | $A_3 = -6.8305 \times 10^{-13}$ | $P_3 = 8.0$ |
| | $A_4 = 1.4776 \times 10^{-16}$ | $P_4 = 10.0$ |
| Eleventh surface | $K = 0.0$ | |
| | $A_1 = -1.9110 \times 10^{-6}$ | $P_1 = 4.0$ |
| | $A_2 = 7.4199 \times 10^{-10}$ | $P_2 = 6.0$ |
| | $A_3 = -1.5371 \times 10^{-12}$ | $P_3 = 8.0$ |
| | $A_4 = 6.3420 \times 10^{-17}$ | $P_4 = 10.0$ |
| Twelfth surface | $K = 0.0$ | |
| | $A_1 = -1.4887 \times 10^{-6}$ | $P_1 = 4.0$ |
| | $A_2 = 8.1016 \times 10^{-12}$ | $P_2 = 6.0$ |
| | $A_3 = -7.9555 \times 10^{-13}$ | $P_3 = 8.0$ |
| | $A_4 = 8.8071 \times 10^{-18}$ | $P_4 = 10.0$ |
| Thirteenth surface | $K = 0.0$ | |
| | $A_1 = -6.5405 \times 10^{-7}$ | $P_1 = 4.0$ |
| | $A_2 = -5.5931 \times 10^{-10}$ | $P_2 = 6.0$ |
| | $A_3 = 6.9976 \times 10^{-13}$ | $P_3 = 8.0$ |
| | $A_4 = -2.6187 \times 10^{-16}$ | $P_4 = 10.0$ |

EXAMPLE 5

Focal length $f = 112.60$
Half-field angle $\omega = 26.3°$
Aperture ratio 1:1.1
Magnification factor 8.44
$|f_1/f_3| = 0.94$ $$f\left(\frac{1}{f_{4a} \cdot \nu_{4a}} + \frac{1}{f_{4b} \cdot \nu_{4b}}\right) = 0.0146$$

$D/f = 8.88 \times 10^{-3}$

| Surface No. | | r | d | n | $\nu_d$ |
|---|---|---|---|---|---|
| 1 | | 86.086 | 25.000 | 1.59162 | 61.2 |
| 2 | | −987.32 | 1.000 | | |
| * 3 | | 116.06 | 5.000 | 1.49425 | 57.0 |
| * 4 | | 102.47 | 13.000 | | |
| 5 | | −290.41 | 5.000 | 1.70490 | 30.1 |
| 6 | | 156.85 | 21.782 | | |
| 7 | | 748.70 | 26.000 | 1.59162 | 61.2 |
| 8 | | −101.94 | 5.000 | 1.62444 | 36.3 |
| 9 | | −202.26 | 1.000 | | |
| 10 | | stop | 13.013 | | |
| * 11 | | 177.93 | 8.800 | 1.49425 | 57.0 |
| * 12 | | −487.45 | 20.455 | | |
| 13 | | −55.328 | 5.500 | 1.62444 | 36.3 |
| 14 | Liq | −334.62 | 26.000 | 1.41651 | |
| 15 | FP | ∞ | 14.147 | 1.53980 | |
| 18 | Fluo-rescent | −350.00 | | | |

-continued

| | surface | | |
|---|---|---|---|
| | | Aspherical coefficient | Power number |
| Third surface | | $K = 0.0$ | |
| | | $A_1 = -1.3369 \times 10^{-6}$ | $P_1 = 4.0$ |
| | | $A_2 = 8.1842 \times 10^{-10}$ | $P_2 = 6.0$ |
| | | $A_3 = -4.5236 \times 10^{-13}$ | $P_3 = 8.0$ |
| | | $A_4 = 8.4640 \times 10^{-17}$ | $P_4 = 10.0$ |
| Fourth surface | | $K = 0.0$ | |
| | | $A_1 = -1.2950 \times 10^{-6}$ | $P_1 = 4.0$ |
| | | $A_2 = 1.1607 \times 10^{-9}$ | $P_2 = 6.0$ |
| | | $A_3 = -6.4488 \times 10^{-13}$ | $P_3 = 8.0$ |
| | | $A_4 = 1.3075 \times 10^{-16}$ | $P_4 = 10.0$ |
| Eleventh surface | | $K = 0.0$ | |
| | | $A_1 = -1.9195 \times 10^{-6}$ | $P_1 = 4.0$ |
| | | $A_2 = 7.3737 \times 10^{-10}$ | $P_2 = 6.0$ |
| | | $A_3 = -1.4862 \times 10^{-12}$ | $P_3 = 8.0$ |
| | | $A_4 = 6.6802 \times 10^{-17}$ | $P_4 = 10.0$ |
| Twelfth surface | | $K = 0.0$ | |
| | | $A_1 = -1.2723 \times 10^{-6}$ | $P_1 = 4.0$ |
| | | $A_2 = -6.5252 \times 10^{-11}$ | $P_2 = 6.0$ |
| | | $A_3 = -8.5673 \times 10^{-13}$ | $P_3 = 8.0$ |
| | | $A_4 = 3.4802 \times 10^{-17}$ | $P_4 = 10.0$ |

Figure 12:
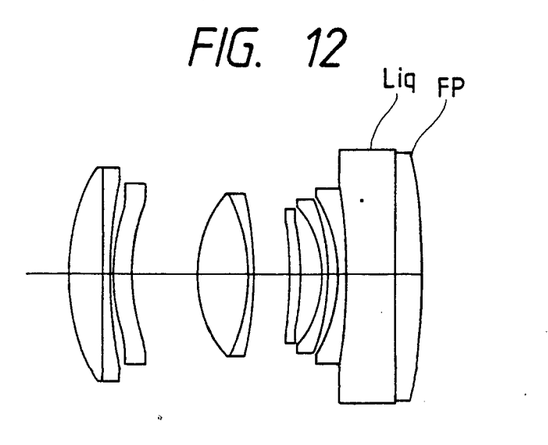
FIG. 12 is a sectional view of a sixth example.
Figure 13:
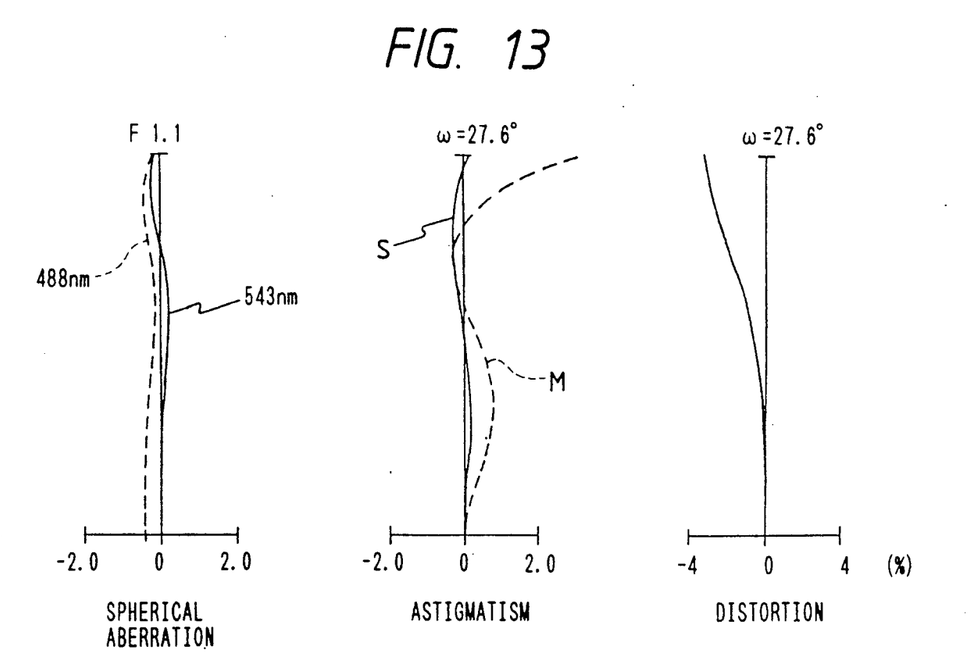
FIG. 13 shows aberration curves thereof.
Figure 14:
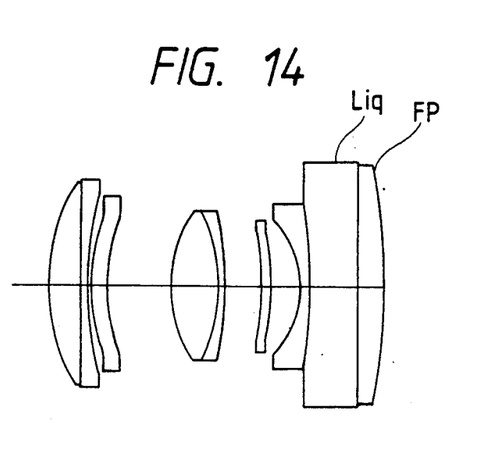
FIG. 14 is likewise a sectional view of a seventh example.
Figure 15:
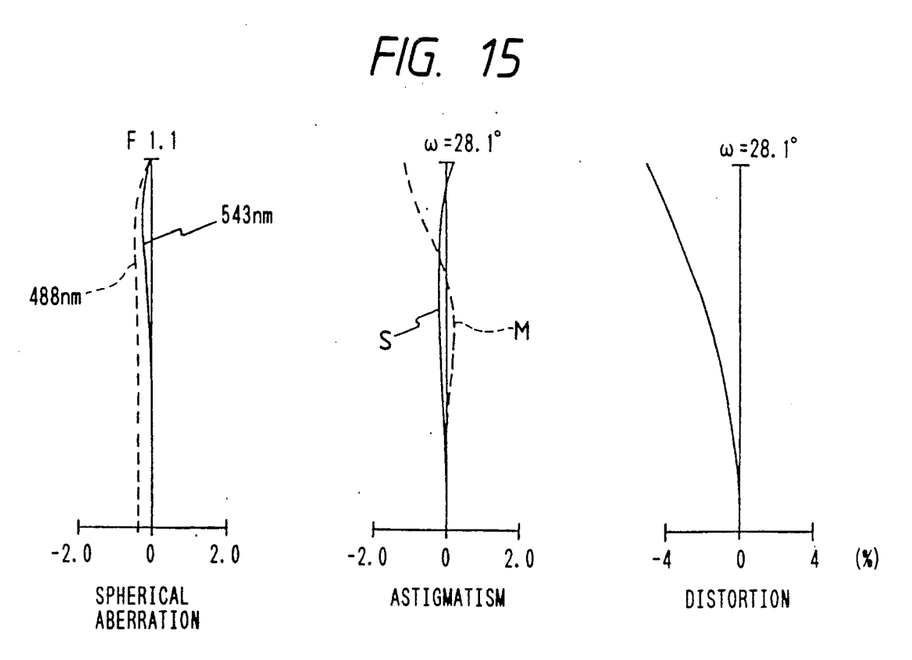
FIG. 15 is aberration curves thereof.

A projection lens for a projector according to the present invention in sixth and seventh examples comprises a first group including, in order from a screen side, a first lens unit having a positive lens and a negative lens which are cemented together, said positive lens located on the screen side and a second unit including a lens having an aspherical surface and having a weak refracting power, and a second group comprising a biconvex positive lens and negative lens cemented.

These examples are fulfilled with the following conditions as the auxiliary conditions, in addition to the aforementioned fundamental structure.

The condition shown in Formula (I) is desired to be within the range of $$-0.05 < f\left(\frac{1}{f_{2+} \cdot \nu_{2+}} + \frac{1}{f_{2-} \cdot \nu_{2-}}\right) < 0.05 \quad (7)$$

$$-0.05 < f\left(\frac{1}{f_{1a} \cdot \nu_{1a}} + \frac{1}{f_{1b} \cdot \nu_{1b}}\right) < 0.05$$

$f_{1a}$: Focal length of a positive lens in a first lens unit
$f_{1b}$: Focal length of a negative lens in a first lens unit
$\nu_{1a}$: Abbe's number of a positive lens in a first lens unit
$\nu_{1a}$: Abbe's number of a negative lens in a first lens unit
$f$: Focal length of the entire system $$0.1 < f/f_{12} < 0.4 \quad (8)$$

where
$f_{12}$: Synthesized focal length of the first and second lens units $$D_{12}/D_{23} < 0.2 \quad (9)$$

where
$D_{12}$: On-the-axis surface space between the first and second lens units
$D_{23}$: On-the-axis surface space between the second lens unit and the second group Also in this example, despite the fact that a spherical glass lens is used as a first lens unit, an aspherical lens having a weak refracting power is arranged directly thereafter whereby correction of spherical aberration, comatic aberration or the like caused by an aperture can be made. Since the first lens is a positive lens, this system is of a telephoto type as compared to a negative-lens precedence type, shortening the total length. A cemented lens is used in the first lens unit and the second group whereby chromatic aberrations are well corrected. The third group has an aspherical lens to correct astigmatism and chromatic aberrations, and the fourth group uses a negative lens having a strong concave surface directed toward the screen to thereby adjust the Petzval's sum. The curvature of field can be well corrected, even for a spherical fluorescent surface.

The condition (7) is concerned with the Abbe's number of the first lens unit and the focal length. The on axis chromatic aberration produced by the positive lens can be well corrected.

The condition (8) is concerned with the focal length of a portion on the screen side of the lens system, that is, the first and second lens units. When $f_{12}$ becomes small and the value exceeds the upper limit of this condition, sagital flares considerably occur. On the other hand, when $f_{12}$ becomes large and the value exceeds the lower limit of the condition, the structure of the telephoto type as a whole is hard to be realized, increasing the total length. Also, it becomes difficult to correct both the on axis and off axis aberrations and expensive parts such as an aspherical fluorescent surface becomes to be indispensable since most of the positive refracting power is borne by the second group.

The condition (9) is concerned with the relative position of the second lens unit in the first and second groups. When the value exceeds the upper limit so that the second lens unit is moved away from the first lens unit, the effect of the aspherical surface of the second lens unit decreases.

EXAMPLE 6

Focal length f = 105.8   Half-field angle ω = 27.6°
Aperture ratio = 1:1.1   Magnification factor = 8.94

$$f\left(\frac{1}{f_{1a} \cdot \nu_{1a}} + \frac{1}{f_{1b} \cdot \nu_{1b}}\right) = 6.35 \times 10^{-4}$$

$$f\left(\frac{1}{f_{2a} \cdot \nu_{2a}} + \frac{1}{f_{2b} \cdot \nu_{2b}}\right) = 8.66 \times 10^{-2}$$

$f/f_{12} = 0.25$, $D_{12}/D_{23} = 0.06$

| Surface No. | | r | d | n | $\nu_d$ |
|---|---|---|---|---|---|
| 1 | | 109.73 | 17.000 | 1.59162 | 61.2 |
| 2 | | ∞ | 3.293 | 1.62444 | 36.3 |
| 3 | | 209.54 | 2.195 | | |
| * 4 | | 79.242 | 9.456 | 1.49425 | 57.0 |
| * 5 | | 71.540 | 35.298 | | |
| 6 | | 69.140 | 26.000 | 1.62307 | 60.3 |
| 7 | | −92.787 | 3.500 | 1.79253 | 25.7 |
| 8 | | −185.00 | 18.967 | | |
| * 9 | | −239.08 | 6.092 | 1.49425 | 57.0 |
| * 10 | | −115.18 | 11.000 | | |
| * 11 | | −48.286 | 4.029 | 1.49425 | 57.0 |
| * 12 | | −71.431 | 4.000 | | |
| 13 | | −80.603 | 4.940 | 1.62444 | 36.3 |
| 14 | Liq | −334.62 | 26.000 | 1.41651 | |
| 15 | FP | | 13.747 | 1.53980 | |
| 16 | Fluorescent surface | −350.00 | | | |

| | Aspherical Coefficient | Power Number |
|---|---|---|
| Fourth surface | K = −4.6977 | |
| | $A_1 = -2.2336 \times 10^{-7}$ | $P_1 = 4.0$ |
| | $A_2 = -8.9912 \times 10^{-10}$ | $P_2 = 6.0$ |
| | $A_3 = 3.0872 \times 10^{-13}$ | $P_3 = 8.0$ |
| | $A_4 = -3.0648 \times 10^{-17}$ | $P_4 = 10.0$ |
| Fifth surface | K = 0.4358 | |
| | $A_1 = -1.7669 \times 10^{-6}$ | $P_1 = 4.0$ |
| | $A_2 = -7.7108 \times 10^{-10}$ | $P_2 = 6.0$ |
| | $A_3 = 3.3825 \times 10^{-13}$ | $P_3 = 8.0$ |
| | $A_4 = -4.1604 \times 10^{-17}$ | $P_4 = 10.0$ |
| Ninth surface | K = 17.111 | |
| | $A_1 = -1.3856 \times 10^{-6}$ | $P_1 = 4.0$ |
| | $A_2 = 1.6783 \times 10^{-9}$ | $P_2 = 6.0$ |
| | $A_3 = -1.4235 \times 10^{-14}$ | $P_3 = 8.0$ |
| | $A_4 = 1.6208 \times 10^{-16}$ | $P_4 = 10.0$ |
| Tenth surface | K = −11.070 | |
| | $A_1 = -1.5769 \times 10^{-6}$ | $P_1 = 4.0$ |
| | $A_2 = 1.7901 \times 10^{-9}$ | $P_2 = 6.0$ |
| | $A_3 = 4.5913 \times 10^{-13}$ | $P_3 = 8.0$ |
| | $A_4 = 1.0292 \times 10^{-16}$ | $P_4 = 10.0$ |
| Eleventh surface | K = −2.0021 | |
| | $A_1 = -7.4058 \times 10^{-7}$ | $P_1 = 4.0$ |
| | $A_2 = 5.8163 \times 10^{-10}$ | $P_2 = 6.0$ |
| | $A_3 = -6.2924 \times 10^{-13}$ | $P_3 = 8.0$ |
| | $A_4 = -1.5816 \times 10^{-17}$ | $P_4 = 10.0$ |
| Twelfth surface | K = −8.7060 ($A_1$ to $A_4$ are zero) | |

EXAMPLE 7

Focal length f = 104.2   Half-field angle ω = 28.1°
Aperture ratio 1:1.1   Magnification factor 8.90

$$f\left(\frac{1}{f_{1a} \cdot \nu_{1a}} + \frac{1}{f_{1b} \cdot \nu_{1b}}\right) = -7.71 \times 10^{-4}$$

$$f\left(\frac{1}{f_{2a} \cdot \nu_{2a}} + \frac{1}{f_{2b} \cdot \nu_{2b}}\right) = 8.70 \times 10^{-3}$$

$f/f_{12} = 0.27$, $D_{12}/D_{23} = 0.06$

| Surface No. | | r | d | n | d |
|---|---|---|---|---|---|
| 1 | | 110.18 | 17.000 | 1.59162 | 61.2 |
| 2 | | −4288.2 | 3.293 | 1.62444 | 36.3 |
| 3 | | 184.52 | 2.195 | | |
| * 4 | | 74.581 | 8.842 | 1.49425 | 57.0 |
| * 5 | | 75.773 | 35.298 | | |
| 6 | | 70.845 | 26.000 | 1.62307 | 60.3 |
| 7 | | −90.297 | 3.500 | 1.79253 | 25.7 |
| 8 | | −174.07 | 19.179 | | |
| * 9 | | −207.39 | 6.092 | 1.49425 | 57.0 |
| * 10 | | −118.26 | 15.360 | | |
| 11 | | −51.481 | 4.940 | 1.62444 | 36.3 |
| 12 | Liq | −334.62 | 26.000 | 1.41651 | |
| 13 | FP | | 14.120 | 1.5398 | |
| 16 | Fluorescent surface | −350.00 | | | |

| | Aspherical Coefficient | Power Number |
|---|---|---|
| Fourth surface | K = 0 | |
| | $A_1 = -1.2607 \times 10^{-6}$ | $P_1 = 4.0$ |
| | $A_2 = -7.5622 \times 10^{-10}$ | $P_2 = 6.0$ |
| | $A_3 = 1.7067 \times 10^{-13}$ | $P_3 = 8.0$ |
| | $A_4 = 4.8331 \times 10^{-13}$ | $P_4 = 10.0$ |
| Fifth surface | K = 0.8292 | |
| | $A_1 = -1.4709 \times 10^{-6}$ | $P_1 = 4.0$ |
| | $A_2 = -9.2952 \times 10^{-10}$ | $P_2 = 6.0$ |
| | $A_3 = 3.1866 \times 10^{-13}$ | $P_3 = 8.0$ |
| | $A_4 = -3.5058 \times 10^{-17}$ | $P_4 = 10.0$ |
| Ninth surface | K = 0 | |
| | $A_1 = -2.0295 \times 10^{-6}$ | $P_1 = 4.0$ |
| | $A_2 = 1.7255 \times 10^{-9}$ | $P_2 = 6.0$ |
| | $A_3 = -3.2630 \times 10^{-14}$ | $P_3 = 8.0$ |
| | $A_4 = 1.4663 \times 10^{-17}$ | $P_4 = 10.0$ |
| Tenth surface | K = 0 | |
| | $A_1 = -8.7810 \times 10^{-7}$ | $P_1 = 4.0$ |
| | $A_2 = 1.5100 \times 10^{-8}$ | $P_2 = 6.0$ |
| | $A_3 = 2.3746 \times 10^{-12}$ | $P_3 = 8.0$ |

| | |
|---|---|
| $A_4 = 1.0712 \times 10^{-15}$ | $P_4 = 10.0$ |

According to the present invention, various aberrations are well corrected as may seen in the examples and aberration curves, and a projection lens for a small projector which is easily manufactured. Furthermore, the half-field angle is 25° or more, and a relatively wide field angle is achieved, greatly contributing to the reduction of the size of the whole apparatus.

What is claimed is:

1. A projection lens for a projector comprising, from a screen side:
   a first lens group including two positive single lenses and a negative single lens;
   a second lens group having a strong refracting power including one positive lens and negative lens;
   a third positive lens group having a relatively weak refracting power, the third lens group having at least one aspherical surface;
   a fourth lens group having a negative lens with a concave surface having a strong curvature directed toward the screen, the fourth lens group having at least one aspherical surface; and
   a curved object surface,
   wherein the following conditions are fulfilled $0.05 < f/f_3 < 0.55$ $0.70 < f/f_2 < 1.30$ where
   $f_3$: Focal length of the third lens group
   $f_2$: Focal length of the second lens group
   f: Equivalent focal length of the entire system.

2. A projection lens for a projector comprising, from a screen side:
   a first lens group including at least one positive lens and a negative lens, said first lens group including a first lens unit comprising a positive lens and a second lens unit comprising a lens having an aspherical surface and having a weak refracting power, and a third lens unit including a bi-concave negative lens;
   a second lens group having a strong refracting power including one positive lens and one negative lens;
   a third positive lens group having a relatively weak refracting power, wherein the third lens group has at least one aspherical surface; and
   a fourth lens group having a negative lens with a concave surface having a strong curvature directed toward the screen,
   which fulfills the following conditions:

$$-0.06 < f\left(\frac{1}{f_{2+} \cdot \nu_{2+}} + \frac{1}{f_{2-} \cdot \nu_{2-}}\right) < 0.09,$$

$\nu_1 < 45, \nu_3 < 4.0,$ $0.9 < |f_1/f_3| < 1.1,$ $D/f < 0.1$ where
   $\gamma_1$: Abbe's number of a positive lens in a first lens unit
   $\gamma_3$: Abbe's number of a negative lens in a third lens unit
   $f_1$: Focal length of a first lens unit
   $f_3$: Focal length of a third lens unit
   D: On-the-axis air space between a first lens unit and a second lens unit
   f: Equivalent focal length of the entire system
   $f_{2+}$: Focal length of a positive lens in the second lens group
   $f_{2-}$: Focal length of a negative lens in the second lens group
   $\gamma_{2-}$: Abbe's number of a positive lens in the second lens group
   $\gamma_{2-}$: Abbe's number of a negative lens in the second lens group.

3. The projection lens as claimed in claim 2 wherein said first lens group comprises one positive lens and one negative lens, said positive lens and said negative lens being respectively single.

4. A projection lens for a projector comprising, from a screen side:
   a first lens group including at least one positive single lens and one negative lens, wherein the first group includes in order from the screen side, the first lens unit having a positive lens and a negative lens cemented with a positive lens located on the screen side and a second lens unit comprising a lens having an aspherical surface and having a weak refracting power;
   a second lens group having a strong refracting power including one positive lens and a negative lens, the second group including a cemented lens having a bi-convex positive lens and a negative lens;
   a third positive lens group having a relatively weak refracting power, the third lens group having at least one aspherical surface; and
   a fourth lens group having a negative lens with a concave surface having a strong curvature directed toward the screen,
   which fulfills the following conditions:

$$-0.05 < f\frac{1}{f_{2+} \cdot \nu_{2+}} + \frac{1}{f_{2-} \cdot \nu_{2-}} < 0.05,$$

$$-0.05 < f\frac{1}{f_{1a} \cdot \nu_{1a}} + \frac{1}{f_{1b} \cdot \nu_{1b}} < 0.05,$$

$D_{12}/D_{23} < 0.2$ where
   $f_{1b}$: Focal length of a positive lens in a first lens and group
   $f_{1b}$: Focal length of a negative lens in a first lens and group
   $\gamma_{1a}$: Abbe's number of a positive lens in a first lens unit
   $\gamma_{1b}$: Abbe's number of a negative lens in a first lens unit
   $D_{12}$: On-the-axis surface space between the first and second lens units
   $D_{23}$: On-the-axis surface space between the second lens unit and the second group
   f: Equivalent focal length of the entire system
   $f_{2+}$: Focal length of a positive lens in the second lens group
   $f_{2-}$: Focal length of a negative lens in the second lens group
   $\gamma_{2+}$: Abbe's number of a positive lens in the second lens group $\gamma_2-$: Abbe's number of a negative lens in the second lens group.

5. The projection lens as claimed in claim 4, wherein the following condition is fulfilled:

$$0.2 < f/f_{12} < 0.4$$

where
$f_{12}$: Synthesized focal length of the first and second lens units.

* * * * *

UNITED STATES PATENT AND TRADEMARK OFFICE
CERTIFICATE OF CORRECTION

PATENT NO. : 5,048,940
DATED : September 17, 1991
INVENTOR(S) : KIICHIROU UEDA ET AL.

It is certified that error appears in the above-identified patent and that said Letters Patent is hereby corrected as shown below:

Title Page, Priority Data, change "1-150167" to --1-15016--.
Below Abstract, change "6 claims" to --5 claims--.
Claim 2, column 13, line 60, change "4.0" to --40--.
Claim 2, column 13, line 66, change " $\gamma_1$ " to -- $\nu 1$ --.
Claim 2, column 13, line 67, change " $\gamma_3$ " to -- $\nu 3$ --.
Claim 2, column 14, line 10, change " $\gamma_2$- " to -- $\nu 2^+$ --.
Claim 2, column 14, line 12, change " $\gamma_2$- " to -- $\nu 2^-$ --.
Claim 4, column 14, line 54, change " $\gamma_{1a}$ " to -- $\nu 1a$ --.
Claim 4, column 14, line 56, change " $\gamma_{1b}$ " to -- $\nu 1b$ --.
Claim 4, column 14, line 67, change " $\gamma_2$- " to -- $\nu 2+$ --.
Claim 4, column 15, line 1, change " $\gamma_2$- " to -- $\nu 2^-$ --.
Claim 5, column 16, line 1, change "0.2" to --0.1--.

Signed and Sealed this

Twenty-second Day of June, 1993

Attest:

MICHAEL K. KIRK

Attesting Officer

Acting Commissioner of Patents and Trademarks